(12) United States Patent
Beals et al.

(10) Patent No.: US 8,786,410 B2
(45) Date of Patent: Jul. 22, 2014

(54) CONFIGURING REMOTE CONTROL DEVICES UTILIZING MATRIX CODES

(75) Inventors: William Michael Beals, Englewood, CO (US); Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 519 days.

(21) Appl. No.: 13/010,557

(22) Filed: Jan. 20, 2011

(65) Prior Publication Data

US 2012/0188112 A1 Jul. 26, 2012

(51) Int. Cl.
*H04N 21/422* (2011.01)

(52) U.S. Cl.
CPC ...... *H04N 21/42225* (2013.01); *G08C 2201/20* (2013.01)
USPC ...................................... 340/12.1; 340/12.28

(58) Field of Classification Search
CPC ........... G05B 2219/23043; G05B 2219/23051; H04N 2005/4423; H04N 21/4104; H04N 21/4131; H04N 21/472; H04N 21/482; H04N 5/44513; H04N 5/44543; H04N 21/42204; H04N 21/42225; H04N 21/4312; H04N 21/485
USPC ............................................ 340/12.21, 12.28
See application file for complete search history.

(56) References Cited

U.S. PATENT DOCUMENTS

| 4,809,325 | A | 2/1989 | Hayashi et al. |
|---|---|---|---|
| 4,837,414 | A | 6/1989 | Edamula |
| 5,500,681 | A | 3/1996 | Jones |
| 5,510,603 | A | 4/1996 | Hess et al. |
| 5,581,636 | A | 12/1996 | Skinger |
| 5,602,377 | A | 2/1997 | Beller et al. |
| 5,703,349 | A | 12/1997 | Meyerson et al. |
| 5,959,285 | A | 9/1999 | Schuessler |

(Continued)

FOREIGN PATENT DOCUMENTS

| CN | 1571503 A | 1/2005 |
|---|---|---|
| CN | 101 227 581 A | 7/2008 |

(Continued)

OTHER PUBLICATIONS

Byford, D., "Universal Interactive Device," International Business Machines Corporation, Jun. 1998, 1 page.

(Continued)

*Primary Examiner* — Daniel Wu
*Assistant Examiner* — John Bamert
(74) *Attorney, Agent, or Firm* — Kilpatrick Townsend & Stockton LLP

(57) ABSTRACT

An electronic device determines information for configuring control of the device by a remote, generates a matrix codes including the information, and transmits the matrix code to a display device. The remote then captures the displayed matrix code, decodes the information, and configures itself to control the electronic device. Configuration of the remote may include pairing, configuring selection elements of the remote, and so on. In some implementations, the electronic device may interact with another device and the information may be for configuring the remote to control the electronic device in the context of the other device. Additionally, in various implementations, the remote may transmit identifying information to the electronic device which may configure itself to further communicate with the remote utilizing such information. Moreover, in various implementations, the remote may capture matrix codes generated by other devices in order to configure the remote to control those devices as well.

19 Claims, 14 Drawing Sheets

(56) References Cited

U.S. PATENT DOCUMENTS

| | | | |
|---|---|---|---|
| 5,978,855 A | 11/1999 | Metz et al. | |
| 6,006,990 A | 12/1999 | Ye et al. | |
| 6,058,238 A | 5/2000 | Ng | |
| 6,438,751 B1 | 8/2002 | Voyticky et al. | |
| 6,512,919 B2 | 1/2003 | Ogasawara | |
| 6,556,273 B1 | 4/2003 | Wheeler et al. | |
| 6,704,929 B1 | 3/2004 | Ozer et al. | |
| 6,983,304 B2 | 1/2006 | Sato | |
| 7,046,161 B2 * | 5/2006 | Hayes | 340/12.25 |
| 7,206,029 B2 | 4/2007 | Cohen-Solal | |
| 7,206,409 B2 | 4/2007 | Antonellis et al. | |
| 7,221,405 B2 | 5/2007 | Basson et al. | |
| 7,244,404 B2 | 7/2007 | Rosenberg et al. | |
| 7,328,848 B2 | 2/2008 | Xia et al. | |
| 7,349,668 B2 | 3/2008 | Ilan et al. | |
| 7,369,180 B2 | 5/2008 | Xing | |
| 7,387,250 B2 | 6/2008 | Muni | |
| 7,394,519 B1 | 7/2008 | Mossman et al. | |
| 7,424,976 B2 | 9/2008 | Muramatsu | |
| 7,443,449 B2 | 10/2008 | Momosaki et al. | |
| 7,487,527 B2 | 2/2009 | Ellis et al. | |
| 7,587,601 B2 | 9/2009 | Levy et al. | |
| 7,604,172 B2 | 10/2009 | Onogi | |
| 7,612,748 B2 | 11/2009 | Tateuchi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,841,531 B2 | 11/2010 | Onogi | |
| 8,010,977 B2 | 8/2011 | Hogyoku | |
| 8,045,054 B2 | 10/2011 | Bishop et al. | |
| 8,186,572 B2 | 5/2012 | Herzig | |
| 8,292,166 B2 | 10/2012 | Gomez et al. | |
| 8,364,018 B2 | 1/2013 | McArdle | |
| 8,386,339 B2 | 2/2013 | Minnick et al. | |
| 8,408,466 B2 | 4/2013 | Gratton | |
| 8,427,455 B2 | 4/2013 | Matsuda | |
| 8,430,302 B2 | 4/2013 | Minnick et al. | |
| 8,439,257 B2 | 5/2013 | Beals et al. | |
| 8,443,407 B2 | 5/2013 | Gaede et al. | |
| 8,468,610 B2 | 6/2013 | Beals et al. | |
| 8,511,540 B2 | 8/2013 | Anguiano | |
| 8,534,540 B2 | 9/2013 | Gratton et al. | |
| 8,550,334 B2 | 10/2013 | Gratton et al. | |
| 8,553,146 B2 | 10/2013 | Kennedy | |
| 2001/0037297 A1 | 11/2001 | McNair | |
| 2001/0052133 A1 | 12/2001 | Pack et al. | |
| 2002/0027612 A1 | 3/2002 | Brill et al. | |
| 2002/0049980 A1 | 4/2002 | Hoang | |
| 2002/0112250 A1 | 8/2002 | Koplar et al. | |
| 2003/0018711 A1 | 1/2003 | Imanishi | |
| 2003/0050854 A1 | 3/2003 | Showghi et al. | |
| 2003/0121978 A1 | 7/2003 | Rubin et al. | |
| 2003/0172374 A1 | 9/2003 | Vinson et al. | |
| 2004/0019691 A1 | 1/2004 | Daymond et al. | |
| 2004/0026508 A1 | 2/2004 | Nakajima et al. | |
| 2004/0044532 A1 | 3/2004 | Karstens | |
| 2004/0046790 A1 | 3/2004 | Agarwal et al. | |
| 2005/0011958 A1 | 1/2005 | Fukasawa et al. | |
| 2005/0015800 A1 | 1/2005 | Holcomb | |
| 2005/0015815 A1 | 1/2005 | Shoff et al. | |
| 2005/0055281 A1 | 3/2005 | Williams | |
| 2005/0059339 A1 | 3/2005 | Honda et al. | |
| 2005/0125301 A1 | 6/2005 | Muni | |
| 2005/0149967 A1 | 7/2005 | Hanley et al. | |
| 2005/0180804 A1 | 8/2005 | Andrew et al. | |
| 2005/0262548 A1 | 11/2005 | Shimojo et al. | |
| 2005/0264694 A1 | 12/2005 | Ilan et al. | |
| 2006/0064700 A1 | 3/2006 | Ludvig et al. | |
| 2006/0071076 A1 | 4/2006 | Tamayama | |
| 2006/0079247 A1 | 4/2006 | Ritter | |
| 2006/0086796 A1 | 4/2006 | Onogi | |
| 2006/0095286 A1 | 5/2006 | Kimura | |
| 2006/0124742 A1 | 6/2006 | Rines et al. | |
| 2006/0196950 A1 | 9/2006 | Kiliccote | |
| 2006/0203339 A1 | 9/2006 | Kleinberger et al. | |
| 2006/0208088 A1 | 9/2006 | Sekiguchi | |
| 2006/0265731 A1 | 11/2006 | Matsuda | |
| 2007/0016934 A1 | 1/2007 | Okada et al. | |
| 2007/0016936 A1 | 1/2007 | Okada et al. | |
| 2007/0017350 A1 | 1/2007 | Uehara | |
| 2007/0019215 A1 | 1/2007 | Yu | |
| 2007/0063050 A1 | 3/2007 | Attia et al. | |
| 2007/0073585 A1 | 3/2007 | Apple et al. | |
| 2007/0143788 A1 | 6/2007 | Abernethy et al. | |
| 2007/0192723 A1 | 8/2007 | Anzelde et al. | |
| 2007/0206020 A1 | 9/2007 | Duffield et al. | |
| 2007/0256118 A1 | 11/2007 | Nomura et al. | |
| 2008/0022323 A1 | 1/2008 | Koo | |
| 2008/0059998 A1 | 3/2008 | McClenny et al. | |
| 2008/0062164 A1 | 3/2008 | Bassi et al. | |
| 2008/0073434 A1 | 3/2008 | Epshteyn et al. | |
| 2008/0077324 A1 | 3/2008 | Hatano et al. | |
| 2008/0082684 A1 | 4/2008 | Gaos et al. | |
| 2008/0092154 A1 | 4/2008 | Hogyoku | |
| 2008/0112615 A1 | 5/2008 | Obrea et al. | |
| 2008/0156879 A1 | 7/2008 | Melick et al. | |
| 2008/0182561 A1 | 7/2008 | Kim et al. | |
| 2008/0189185 A1 | 8/2008 | Matsuo et al. | |
| 2008/0200153 A1 | 8/2008 | Fitzpatrick et al. | |
| 2008/0200160 A1 | 8/2008 | Fitzpatrick et al. | |
| 2008/0201078 A1 | 8/2008 | Fitzpatrick et al. | |
| 2008/0244675 A1 | 10/2008 | Sako et al. | |
| 2008/0267537 A1 | 10/2008 | Thuries | |
| 2008/0281624 A1 | 11/2008 | Shibata | |
| 2008/0288600 A1 | 11/2008 | Clark | |
| 2008/0307348 A1 | 12/2008 | Jones et al. | |
| 2009/0029725 A1 | 1/2009 | Kindberg | |
| 2009/0031071 A1 | 1/2009 | Chiu | |
| 2009/0031373 A1 | 1/2009 | Hogyoku | |
| 2009/0070699 A1 | 3/2009 | Birkill et al. | |
| 2009/0083808 A1 | 3/2009 | Morrison | |
| 2009/0088213 A1 | 4/2009 | Rofougaran | |
| 2009/0094546 A1 | 4/2009 | Anzelde et al. | |
| 2009/0108057 A1 | 4/2009 | Mu et al. | |
| 2009/0113334 A1 | 4/2009 | Chakra et al. | |
| 2009/0154759 A1 | 6/2009 | Koskinen et al. | |
| 2009/0157511 A1 | 6/2009 | Spinnell et al. | |
| 2009/0157530 A1 | 6/2009 | Nagamoto et al. | |
| 2009/0172780 A1 * | 7/2009 | Sukeda et al. | 726/3 |
| 2009/0179852 A1 | 7/2009 | Refai et al. | |
| 2009/0180025 A1 | 7/2009 | Dawson | |
| 2009/0212112 A1 | 8/2009 | Li et al. | |
| 2009/0212113 A1 | 8/2009 | Chiu et al. | |
| 2009/0234570 A1 | 9/2009 | Sever | |
| 2009/0254954 A1 | 10/2009 | Jeong | |
| 2009/0294538 A1 | 12/2009 | Wihlborg et al. | |
| 2009/0303036 A1 | 12/2009 | Sahuguet | |
| 2009/0307232 A1 | 12/2009 | Hall | |
| 2009/0312105 A1 | 12/2009 | Koplar | |
| 2010/0017457 A1 | 1/2010 | Jumpertz et al. | |
| 2010/0020970 A1 | 1/2010 | Liu et al. | |
| 2010/0031162 A1 | 2/2010 | Wiser et al. | |
| 2010/0036936 A1 | 2/2010 | Cox et al. | |
| 2010/0052847 A1 * | 3/2010 | Mortensen | 340/5.53 |
| 2010/0053339 A1 | 3/2010 | Aaron et al. | |
| 2010/0081375 A1 | 4/2010 | Rosenblatt et al. | |
| 2010/0089996 A1 | 4/2010 | Koplar | |
| 2010/0096448 A1 | 4/2010 | Melick et al. | |
| 2010/0103018 A1 | 4/2010 | Yoon et al. | |
| 2010/0114715 A1 | 5/2010 | Schuster et al. | |
| 2010/0129057 A1 | 5/2010 | Kulkarni | |
| 2010/0131900 A1 | 5/2010 | Spetalnick | |
| 2010/0131970 A1 | 5/2010 | Falcon | |
| 2010/0131983 A1 | 5/2010 | Shannon et al. | |
| 2010/0149187 A1 | 6/2010 | Slavin et al. | |
| 2010/0154035 A1 | 6/2010 | Damola et al. | |
| 2010/0161437 A1 | 6/2010 | Pandey | |
| 2010/0163613 A1 | 7/2010 | Bucher et al. | |
| 2010/0201894 A1 | 8/2010 | Nakayama et al. | |
| 2010/0217663 A1 | 8/2010 | Ramer et al. | |
| 2010/0225653 A1 | 9/2010 | Sao et al. | |
| 2010/0261454 A1 | 10/2010 | Shenfield et al. | |
| 2010/0262924 A1 | 10/2010 | Kalu | |

(56) References Cited

U.S. PATENT DOCUMENTS

| | | |
|---|---|---|
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007218 A1 | 1/2011 | Moran et al. |
| 2011/0030068 A1 | 2/2011 | Imai |
| 2011/0039573 A1 | 2/2011 | Hardie |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2013/0068838 A1 | 3/2013 | Gomez et al. |
| 2013/0239157 A1 | 9/2013 | Gaede et al. |
| 2014/0076963 A1 | 3/2014 | Gratton et al. |

FOREIGN PATENT DOCUMENTS

| | | | |
|---|---|---|---|
| DE | 10 2007 038 810 A1 | 2/2009 | |
| EP | 1 021 035 A1 | 7/2000 | |
| EP | 1 383 071 A2 | 1/2004 | |
| EP | 1 724 695 A1 | 11/2006 | |
| EP | 1 757 222 A1 | 2/2007 | |
| EP | 1 768 400 A2 | 3/2007 | |
| EP | 2 079 051 A1 | 7/2009 | |
| EP | 2 131 289 A1 | 12/2009 | |
| EP | 2 439 936 A2 | 4/2012 | |
| FR | 2 565 748 A1 | 12/1985 | |
| GB | 2 044 446 A | 10/1980 | |
| GB | 2 165 129 A | 4/1986 | |
| GB | 2 311 451 A | 9/1997 | |
| GB | 2 325 765 A | 12/1998 | |
| GB | 2 471 567 A | 1/2001 | |
| JP | 2002-215768 A | 8/2002 | |
| JP | 2007-213548 A | 8/2007 | |
| JP | 2008 244556 A | 10/2008 | |
| KR | 2004 0087776 A | 10/2004 | |
| WO | 95/27275 A1 | 10/1995 | |
| WO | 97/41690 A1 | 11/1997 | |
| WO | 01/06593 A2 | 1/2001 | |
| WO | 01/18589 A1 | 3/2001 | |
| WO | 2005/109338 A1 | 11/2005 | |
| WO | 2007/009005 A1 | 1/2007 | |
| WO | 2009/057651 | 5/2009 | |
| WO | 2009/144536 A1 | 12/2009 | |
| WO | 2010/149161 A1 | 12/2010 | |
| WO | 2011/009055 A2 | 1/2011 | |
| WO | 01/58146 A2 | 8/2011 | |

OTHER PUBLICATIONS

International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
Extended European Search RFeport for EP 12152690.9 dated Jun. 19, 2012, 9 pages.
International Search Report and Written Opinion of PCT/US2012/026624 mailed Aug. 29, 2012, 14 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.

(56) References Cited

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WiFi for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&repl&type=pdf.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

International Search Report and Written Opinion of PCT/US11/64709 mailed on Apr. 10, 2012, 8 pages.

International Search Report and Written Opinion of PCT/US2011/060098 mailed on Mar. 29, 2012, 10 pages.

International Search Report and Written Opinion of PCT/US2011/063308 mailed on Mar. 29, 2012, 10 pages.

International Search Report and Written Opinion of PCT/US2011/068176 mailed on Mar. 29, 2012, 15 pages.

U.S. Appl. No. 12/964,478, filed Dec. 9, 2010, Non-Final Office Action mailed Mar. 26, 2013, 19 pages.

U.S. Appl. No. 12/961,369, filed Dec. 6, 2010, Non-Final Office Action mailed Mar. 25, 2013, 17 pages.

U.S. Appl. No. 12/953,227, filed Nov. 23, 2010, Final Office Action mailed May 24, 2013, 17 pages.

U.S. Appl. No. 12/973,431, filed Dec. 20, 2010, Non-Final Rejection mailed May 15, 2013, 30 pages.

U.S. Appl. No. 13/014,591, Notice of Allowance mailed May 24, 2013, 32 pages.

U.S. Appl. No. 13/007,317, Notice of Allowance mailed May 13, 2013, 16 pages.

U.S. Appl. No. 13/031,115, Notice of Allowance mailed Apr. 16, 2013, 24 pages.

U.S. Appl. No. 13/034,482, filed Feb. 24, 2011, Final Office Action mailed Apr. 25, 2013, 19 pages.

U.S. Appl. No. 13/035,474, filed Feb. 25, 2011, Final Rejection mailed Mar. 29, 2013, 20 pages.

U.S. Appl. No. 12/960,285, filed Dec. 3, 2010, Final Office Action mailed Apr. 18, 2013, 14 pages.

U.S. Appl. No. 13/035,525, filed Feb. 25, 2011, Non-Final Office Action mailed May 15, 2013, 15 pages.

U.S. Appl. No. 12/958,073, filed Dec. 1, 2010, Notice of Allowance mailed on Jan. 17, 2013, 17 pages.

U.S. Appl. No. 12/981,244, filed Dec. 29, 2010, Office Action mailed Dec. 21, 2012, 23 pages.

U.S. Appl. No. 12/984,385, filed Jan. 4, 2011, Notice of Allowance mailed Nov. 28, 2012, 11 pages.

U.S. Appl. No. 13/015,382, filed Jan. 27, 2011, Notice of Allowance mailed Feb. 22, 2013, 12 pages.

U.S. Appl. No. 13/007,317, filed Jan. 14, 2011, Office action mailed Dec. 19, 2012, 29 pages.

U.S. Appl. No. 13/020,678, filed Feb. 3, 2011, Notice of Allowance mailed Jan. 3, 2013, 13 pages.

U.S. Appl. No. 13/028,030, filed Feb. 15, 2011, Office Action mailed Jan. 11, 2013, 14 pages.

U.S. Appl. No. 13/035,525, filed Feb. 25, 2011, Final Office Action mailed Jan. 31, 2013, 26 pages.

U.S. Appl. No. 13/037,302, filed Feb. 28, 2011 Office Action mailed Mar. 1, 2013, 20 pages.

U.S. Appl. No. 13/037,312, filed Feb. 28, 2011, Final Office Action mailed Feb. 28, 2013, 18 pages.

U.S. Appl. No. 13/037,316, filed Feb. 28, 2011, Office Action mailed Jan. 30, 2013, 21 pages.

U.S. Appl. No. 13/037,333, filed Feb. 28, 2011 Notice of Allowance mailed Jan. 18, 2013, 27 pages.

U.S. Appl. No. 13/673,480, filed Nov. 9, 2012 Office Action mailed Jan. 16, 2013, 27 pages.

U.S. Appl. No. 12/958,073, filed Dec. 1, 2010, Office Action mailed Aug. 31, 2012, 12 pages.

U.S. Appl. No. 12/061,369, filed Dec. 6, 2010, Final Rejection mailed Oct. 30, 2012, 17 pages.

U.S. Appl. No. 12/971,349, filed Dec. 7, 2010, Final Rejection mailed Oct. 24, 2012, 11 pages.

U.S. Appl. No. 12/953,227, filed Nov. 23, 2010, Office Action mailed Nov. 7, 2012, 31 pages.

U.S. Application No. 13/015,382, filed Jan. 27, 2011, Office Action Mailed Nov. 13, 2012, 7 pages.

U.S. Appl. No. 13/016,483, filed Jan. 28, 2011 Office Action mailed Nov. 2, 2012, 18 pages.

(56) References Cited

OTHER PUBLICATIONS

U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 13/037,312, filed Feb. 28, 2011, Office Action mailed Aug. 15, 2012, 9 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
U.S. Appl. No. 12/961,369, filed Dec. 6, 2010, Non-Final Office Action mailed Feb. 13, 2014, 21 pages.
U.S. Appl. No. 12/965,645, filed Dec. 10, 2010, Final Office Action, mailed Mar. 18, 2014, 24 pages.
U.S. Appl. No. 13/035,474, filed Feb. 25, 2011, Non Final Rejection mailed Mar. 6, 2014, 20 pages.
U.S. Appl. No. 13/037,312, filed Feb. 28, 2011, Notice of Allowance mailed Jun. 13, 2013, 10 pages.
U.S. Appl. No. 13/192,287, filed Jul. 27, 2011, Final Office Action mailed Jan. 28, 2014, 18 pages.
U.S. Appl. No. 13/968,611, filed Aug. 16, 2013, Non-Final Office Action mailed Jan. 17, 2014, 21 pages.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/971,349, filed Dec. 7, 2010, Notice of Allowance mailed Oct. 2, 2013, 24 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.

* cited by examiner

CONFIGURING REMOTE CONTROL DEVICES UTILIZING MATRIX CODES

FIELD OF THE INVENTION

This disclosure relates generally to remote controls for electronic devices, and more specifically to configuring remote controls for electronic devices utilizing matrix codes.

SUMMARY

The present disclosure discloses systems and methods for configuring remote control devices using matrix codes. An electronic device may determine configuration information for configuring control of the electronic device by one or more remote control devices and may generate one or more matrix codes (including, but not limited to, a QR Code®) that includes the configuration information. The electronic device may then transmit the matrix code to a display device and a remote control device may optically capture the matrix code, decode the configuration information, and configure itself to control the electronic device utilizing the configuration information.

The configuration information may include a communication identifier for the electronic device, a network address for the electronic device, instructions to add/remove/alter remote control device functionality, model or serial numbers of the electronic device, and so on. Configuration of the remote control device may include pairing the remote control device and the electronic device, configuring selection elements of the remote control device, and so on. In some implementations, the electronic device may interact with another electronic device and the configuration information may be for configuring the remote control device to control the electronic device in the context of the other electronic device.

Additionally, in various implementations, the remote control device may transmit remote control identifying information to the electronic device and the electronic device may configure itself to further communicate with the remote control device utilizing such identifying information. Moreover, in various implementations, the remote control device may capture matrix codes generated by other electronic devices in order to configure the remote control device to control those devices as well.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
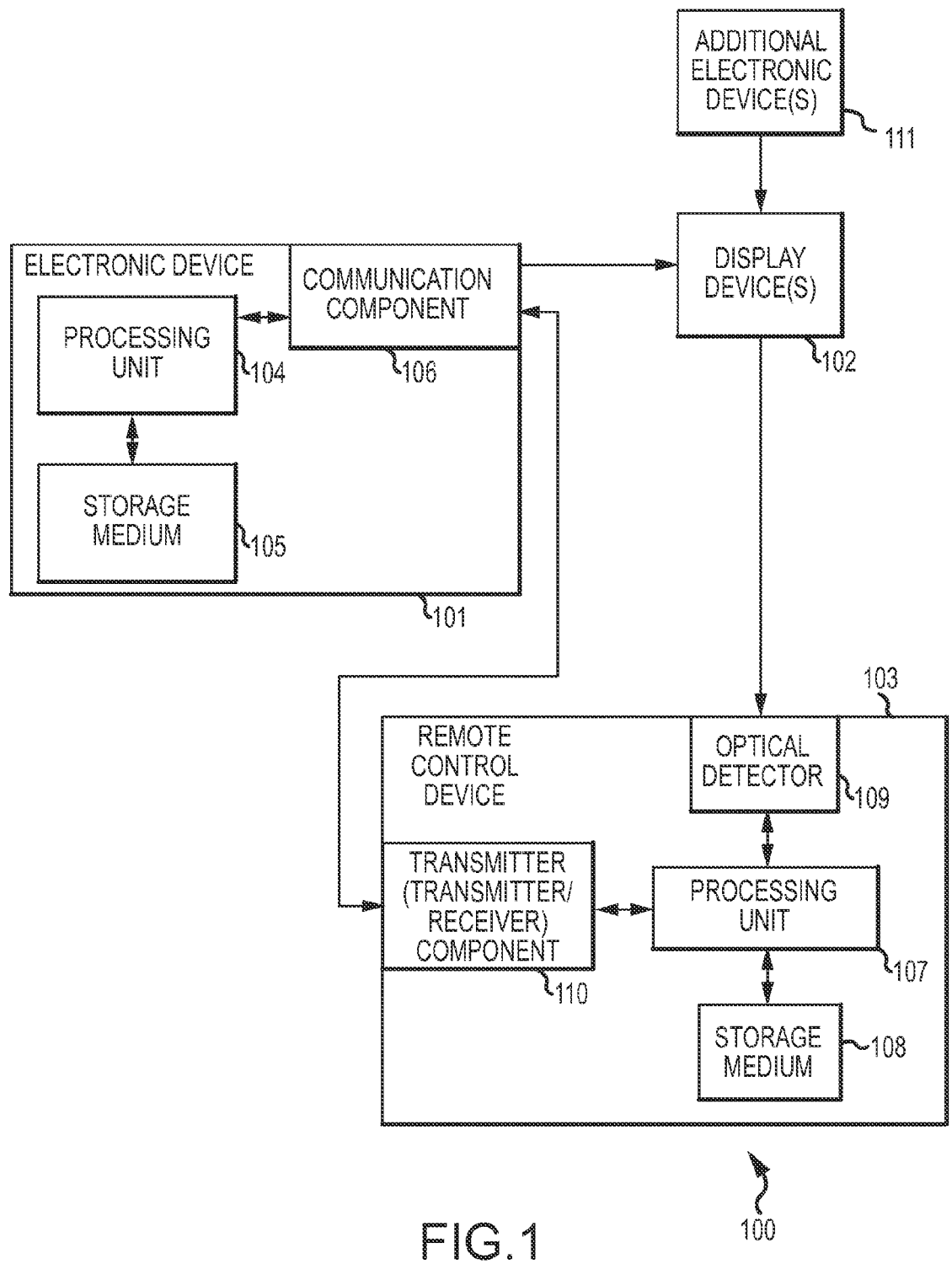
FIG. 1 is a block diagram illustrating a system for configuring remote control devices using matrix codes.

The description that follows includes sample systems, methods, and computer program products that embody various elements of the present disclosure. However, it should be understood that the described disclosure may be practiced in a variety of forms in addition to those described herein.

Electronic devices (such as set top boxes, television receivers, desktop computers, televisions, computer monitors, electronic kitchen appliances, stereo equipment, entertainment system components, digital video recorders, digital video disc players, and so on) perform a variety of different functions. Users of such electronic devices may utilize remote control devices to control the functions performed by the electronic devices remotely as opposed to having to directly manipulate selection elements (such as buttons, touch screens, and so on) incorporated directly into the electronic devices. In fact, some remote control devices may even include selection elements for controlling functions of electronic devices for which the electronic devices do not include selection elements, instead relying on a remote control device to provide an interface to such functionality.

In some cases, electronic devices may be associated with a single, simplistic remote control device that is pre-dedicated to a specific electronic device. However, in many cases an electronic device may be controlled utilizing more than one particular remote control device, a remote control device may be utilized to control more than one electronic device (such as a single "universal remote" which can be configured to control multiple devices such as a set top box, a television, a digital video disc player, and so on), and/or a remote control device may include advanced functionality which may require configuration.

As such, remote control devices may need to be paired with an electronic device prior to being utilized to control the electronic device. Pairing remote control devices with electronic devices and/or otherwise configuring the remote control devices may require users to perform various, potentially complex, operations.

For example, as part of pairing a remote control device with an electronic device, users may need to enter an identifier for an electronic device into a remote control device so that transmissions from the remote control device can be tagged with the identifier and the electronic device recognizes the transmissions as instructions (and vice versa), perform a pairing sequence where network addresses are exchanged through a radio frequency or infra-red communication link between a remote control device and an electronic device (such as exchanging media access control addresses between a set top box and a ZIGBEE® remote), and so on. Further, users may have to configure one or more selection elements of a remote control device to record macro sequences, alter functionality associated with selection elements, program associations between functionality and selection elements, and so on.

Requiring users to enter information at either an electronic device or a remote control device (such as entering address information at one of the devices for the opposing device, entering selection element configuration information at the remote control device) may be burdensome. This is particularly the case when the information to be entered is more than a few numbers or characters, such as a 16 hexadecimal digit media access control address. Exchanging information between an electronic device and a remote control device utilizing a radio frequency or infra-red communication link prevents a user from having to enter the information manually, but is still very limited in the amount of information that can be transmitted during a particular length of time.

In the present disclosure, an electronic device may determine configuration information for configuring one or more remote control devices to control the electronic device. The electronic device may interact (cooperate) with another electronic device and the configuration information may be for configuring the remote control device to control the electronic device in the context of the other electronic device. The electronic device may generate one or more matrix codes that includes the configuration information and may then transmit the matrix code to a display device (which may be a component of the electronic device in some implementations). The remote control device may optically capture (or detect) the matrix code displayed on the display device. The remote control device may then decode (or derive) the configuration information from the captured matrix code and configure itself to control the electronic device utilizing the configuration information.

The configuration may include pairing the remote control device with the electronic device; configuring selection elements of the remote control device to perform add, alter, and/or remove control device functions; and so on. The configuration information may include any information that the remote control device may utilize to configure itself to control the electronic device such as a communication identifier for the electronic device; a network address for the electronic device; instructions to add, remove and/or alter remote control device functionality; electronic device specifying information such as model or serial numbers which the remote control device may utilize to consult a local or remote database for instructions regarding configuration of remote control device functionality; and so on.

In some implementations, the remote control device may then transmit remote control information, such as remote control identifying information, to the electronic device (such as utilizing a radio frequency communication connection, an infra-red communication connection, a network communication connection, and so on). Additionally, the remote control device may capture matrix codes generated by other electronic devices in order to configure the remote control device to control those devices as well.

FIG. 1 is a block diagram illustrating a system 100 for configuring remote control devices using matrix codes. The system 100 includes an electronic device 101, one or more display device(s) 102, and a remote control device 103. The system may also include one or more additional electronic devices 111. The electronic device may be any kind of electronic device such as a set top box, a television receiver, a desktop computer, a television, a computer monitor, an electronic kitchen appliance, a stereo component, an entertainment system component, a digital video recorder, a digital video disc player, and so on. The remote control device may include any kind of device that can be configured to control the electronic device such as a remote control, a mobile computer (such as a tablet computer, a smart phone, a personal digital assistant, and so on) that includes software to implement remote control functionality, and so on. The display device may be any kind of display device such as a television, a computer monitor, a cathode ray tube display, a liquid crystal display, and so on. Similar to the electronic device, the additional electronic device may be any kind of electronic device such as a digital video disc player, an AV amplifier, a game machine, and so on.

The electronic device 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), and one or more communication components 106. The processing unit may execute instructions stored in the non-transitory storage medium to determine configuration information for configuring the remote control device 103 to control the electronic device, generate one or more matrix codes that include the configuration information, and transmit the matrix code to the display device 102 via the communication component. Similarly, the additional electronic device 111 may generate one or more additional matrix codes that include configuration information for configuring the remote control device to control the additional electronic device and transmit such additional matrix codes to the display device.

The remote control device 103 may include one or more processing units 107, one or more non-transitory storage media, one or more optical detectors 109 (such as a still image camera, video camera, barcode scanner, and so on), and one or more transmitter components 110 (which may be a component capable of both transmitting and receiving signals). The processing unit of the remote control device may execute instructions stored in the non-transitory storage medium of the remote control device to capture (or detect) the matrix code displayed on the display device 102 utilizing the optical detector, decode (or derive) the configuration information from that at least one matrix code, and configure the remote control device to control the electronic device 101 utilizing the configuration information.

In addition, the processing unit of the remote control device 103 may also transmit information, such as remote identifying information (which may be a communication address or identifier for the remote control device, a network address for the remote control device, and so on), to the electronic device 101 via the transmitter component 110 in response to the configuration information. In response to receiving the remote identifying information, the electronic device may configure itself such that further communications with the remote control device utilize the remote identifying information. Furthermore, the remote control device may also detect another matrix code generated by another electronic device (such as the display device, the additional electronic device 111, other devices connected to the display device such as a digital video disc player, an AV amplifier, a game machine, other devices/display combinations, and so on), decode additional configuration information, and utilize the additional configuration information to configure itself to control the other electronic device in addition to the electronic device.

Figure 2:
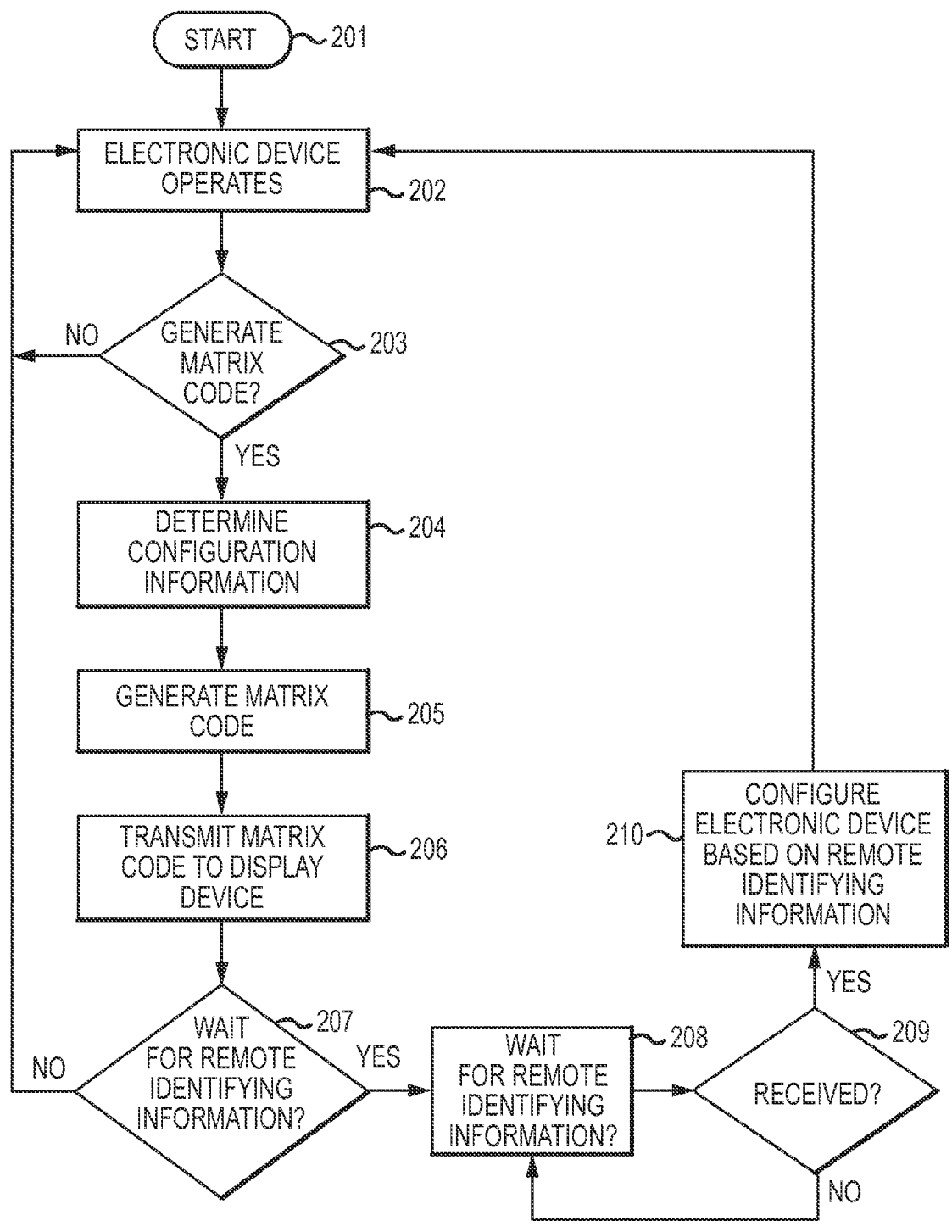
FIG. 2 is a flow chart illustrating a method for configuring remote control devices using matrix codes. This method may be performed by the system of FIG. 1.

FIG. 2 illustrates a method 200 for configuring remote control devices using matrix codes. The method 200 may be performed by the electronic device 101 of FIG. 1. The flow begins at block 201 and proceeds to block 202 where the electronic device operates. The flow then proceeds to block 203 where the processing unit 104 determines whether or not to generate a matrix code. If so, the flow proceeds to block 204. Otherwise, the flow returns to block 202 where the electronic device continues to operate.

At block 204, after the electronic device 101 determines to generate a matrix code, the electronic device determines the configuration information for configuring the remote control device 103 to control the electronic device. The electronic device may determine the configuration information by retrieving configuration information from the non-transitory storage medium 105. Next, the flow proceeds to block 205 where the electronic device generates the matrix code including the configuration information. The flow then proceeds to block 206 where the electronic device transmits the matrix code to the display device 102. Next, the flow proceeds to block 207 where the electronic device determines whether or not to wait for the remote control device to transmit remote identifying information. If so, the flow proceeds to block 208. If not, the flow returns to block 202 where the electronic device continues to operate.

At block 208, after the electronic device 101 determines to wait for the remote control device 103 to transmit remote identifying information, the electronic device waits for such information. The flow then proceeds to block 209 where the electronic device determines whether or not remote identifying information has been received. If so, the flow proceeds to block 210. Otherwise, the flow returns to block 208 where the electronic device continues to wait for the remote identifying information to be received.

At block 210, after the electronic device 101 receives the remote identifying information, the electronic device configures itself such that further communications the electronic device transmits to the remote control device 103 utilize the remote identifying information. Then, the flow returns to block 202 where the electronic device continues to operate.

Figure 3:
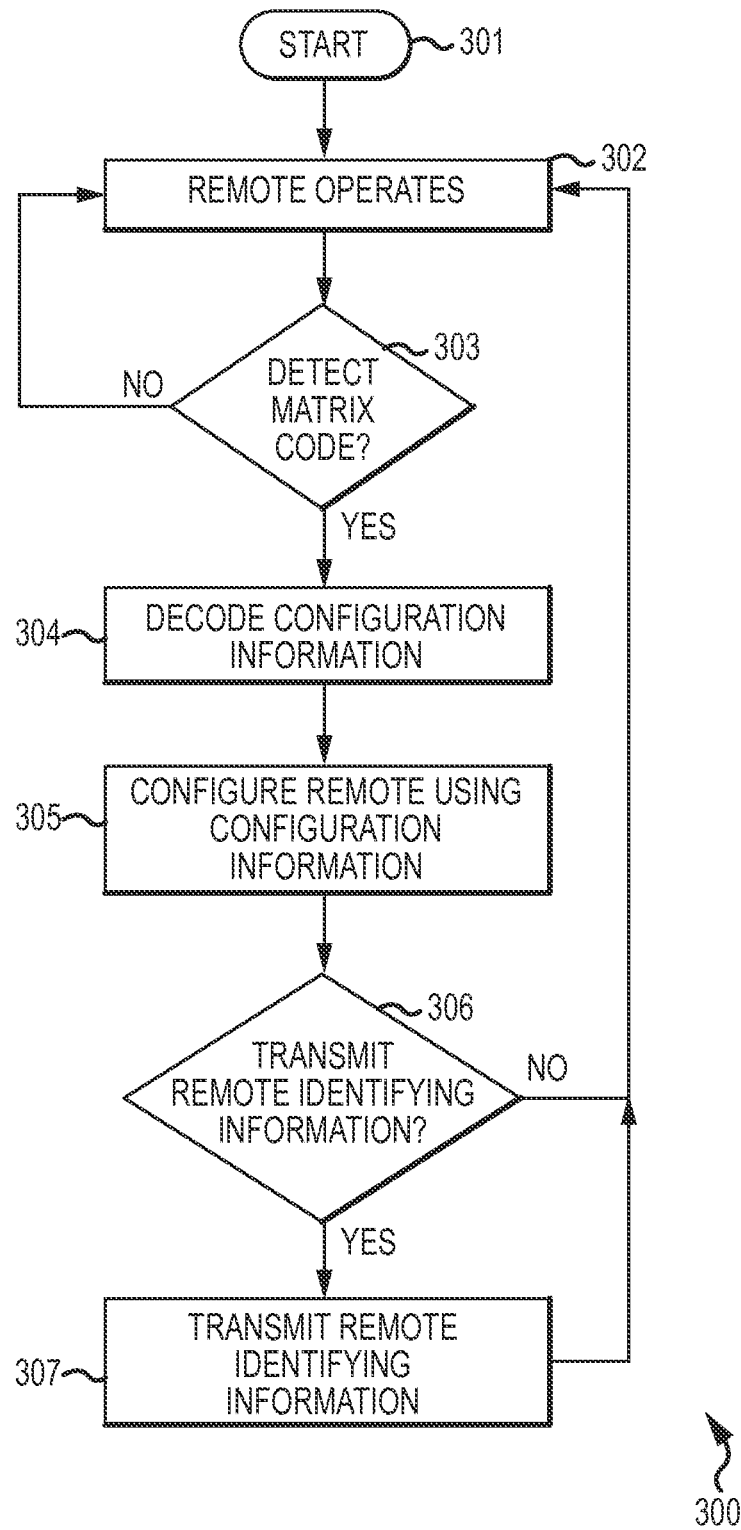
FIG. 3 is a flow chart illustrating a method for configuring a remote control device using matrix codes. This method may be performed by the system of FIG. 1.

FIG. 3 illustrates a method 300 for configuring a remote control device using matrix codes. The method 300 may be performed by the remote control device 103 of FIG. 1. The flow begins at block 301 and proceeds to block 302 where the remote control device operates. The flow then proceeds to block 303 where the remote control device determines whether or not the optical detector 109 has detected a matrix code. If so, the flow proceeds to block 304. Otherwise, the flow returns to block 302 where the remote control device continues to operate.

It is understood that although the method 300 describes the remote control device 103 as constantly determining whether matrix codes have been detected during operation, other arrangements are possible without departing from the scope of the present disclosure. For example, the remote control device may determine whether a matrix code has been detected during operation in response to user input. In such an implementation, the remote control device may determine whether a matrix code has been detected after a user has provided input indicating to capture a matrix code.

At block 304, after the remote control device 103 determines that the optical detector 109 has detected a matrix code, the remote control device decodes configuration information from the matrix code and the flow proceeds to block 305. At block 305, the remote control device configures itself to control the electronic device 101 utilizing the configuration information. Next, the flow proceeds to block 306 where the remote control device determines whether or not to transmit remote identifying information to the electronic device. If so, the flow proceeds to block 307. Otherwise, the flow returns to block 302 where the remote control device continues to operate.

At block 307, after the remote control device 103 determines to transmit remote identifying information to the electronic device 101, the remote control device transmits such information. Then, the flow returns to block 302 where the remote control device continues to operate.

Returning to FIG. 1, the configuration information may include information for pairing the remote control device 103 with the electronic device 101 and the remote control device may configure itself to control the electronic device by pairing itself with the electronic device. For example, the configuration information may include communication identifiers for the electronic device, network addresses for the electronic device, and so on and the remote control device may configure itself such that further communications that the remote control device transmits to the electronic device utilize the communication identifiers, network addresses, and so on.

The configuration information may include information for adding, altering, and/or removing one or more remote control device functions that may be associated with one or more selection elements of the remote control device 103 (such as one or more buttons, touch screens, virtual buttons, keys, and so on) (not shown) and/or associating such functions with such selection elements. In some implementations, the configuration may include instructions for such adding, altering, and/or removing such remote control device functions and or associating such functions with selection elements.

However, in other implementations, the configuration information may include identifying information for the electronic device 101 (such as one or more serial numbers, model numbers, and so on). In such implementations, the remote control device may utilize the identifying information to query for instructions for such adding, altering, and/or removing such remote control device functions and or associating such functions with selection elements in a database (which may be maintained by locally the remote control device in the non-transitory storage medium 108, remotely by a database server such as a provider communicably connected to the electronic device or the remote control device, and so on) utilizing the identifying information.

By way of an example of an instruction that may remove remote control functionally, the remote control device 103 may include a keyboard on an underside surface that lights up when turned upward. However, the electronic device 101 may not include functionality related to the keyboard. As such, the configuration information may include instructions to disable the keyboard and the light up feature. Hence, users may not be confused when the keyboard lights up when turned upward but does not correspond to functions of the electronic device.

By way of an example of an instruction that may add remote control functionally, the remote control device 103 may include buttons that are configurable to perform macros (or series of commonly executed actions). As such, the configuration information may include instructions that configure the buttons to perform one or more macros.

By way of an example of an instruction that may alter remote control functionally, the electronic device 101 may be a set top box and the display device may be a television on which the set top box displays programming content. The remote control device 103 may be a "universal remote" which is already configured to control the television and the configuration information may configure the universal remote to control the set top box as well as the television. In this example, a user may need to change a channel setting of the set top box as opposed to the television in order to access a different channel of content than the one displayed (whereas changing the channel setting of the television off of a home channel may prevent the programming provider by the set top box from being displayed on the television). As such, the configuration information may include instructions to alter the remote functionality associated with channel selection elements of the universal remote such that operation of the channel selection elements changes the channel setting of the set top box instead of the television. Hence, when the user utilizes the channel selection elements to select a desired channel, the desired channel is displayed by the set top box on the television instead of switching the television to blank information or static.

In some implementations, in addition to displaying matrix codes generated by the electronic device 101, the display device 102 may itself generate and/or display matrix codes. Such matrix codes generated and displayed by the display device may include configuration information that the remote control device 103 may utilize to configure itself to control the display device. For example, the electronic device may be a television receiver and the display device may be a television. As such, the television may display matrix codes generated by the television receiver (which may include configuration information that the remote control device may utilize to configure itself to control the television receiver) as well as generating and displaying its own matrix codes which may include configuration information that the remote control device may utilize to configure itself to control the television.

In various implementations, the electronic device 101 may be operable to display a menu on the display device 102 that prompts a user for to select one of a number of remote configuration profiles. Such remote configuration profiles may include user proficiency remote configuration profiles, electronic device capability remote configuration profiles, regular user and super user remote configuration profiles, electronic device location remote configuration profiles, and so on.

For example, the user may be prompted to select a user proficiency configuration profile to indicate their level of user proficiency (or how technically adept the user believes he is with regards to operating the electronic device), such as allowing the user to choose between a basic level of proficiency and an advanced level of proficiency. If the user chooses the basic level, the electronic device may include instructions to only enable a subset of remote control features in the configuration information as opposed to the full set of available remote control features which may be included if the user selects the advanced setting. For example, the electronic device may be a digital video recorder and the remote control device may include selection elements for indicating selections of programming content to record as well as selection elements for modifying or deleting programming content stored by the digital video recorder. If a user selects the basic level, the digital video recorder may include instructions in the configuration information to configure the selection elements associated with indicating selections of content to record but not to configure the selection elements associated with modifying or deleting previously recorded content. As such, a novice user may be protected from unknowingly deleting recorded content for which they have already paid. However, if a user selects advances level, the digital video recorder may include instructions in the configuration information to configure both the selection elements associated with indicating selections of content to record and the selection elements associated with modifying or deleting previously recorded content. As such, a more advanced user may be able to utilize the remote control device to control the full functionality available for the digital video recorder.

In some implementations, the electronic device 101 may interact with another electronic device to cooperatively perform functions. For example, the electronic device may be a set top box and may interact with the display device 102 (which may be a television) to obtain and display programming content. Further, the electronic device may obtain and display content for multiple televisions (such as where a set top box includes multiple tuners and provides the programming content obtained from each respective tuner to a different television) of which the display device is only one. As such, the configuration information may include information for controlling the electronic device in the context of the display device. The configuration information may include a specific network address to which to send communications from the remote control device 103 that are intended for the electronic device/display device combination. For instance, by transmitting a command from the remote control device to the specific network address to change a channel, the electronic device transmits the updated channel to the display device as opposed to another television that is connected to the electronic device.

Additionally, in some implementations, the electronic device 101 may generate the matrix code and transmit it to the display device 102 in response to an instruction received from another electronic device (such as via a control signal transmitted utilizing a HDMI [High-Definition Multimedia Interface] cable). For example, the electronic device and the display device may be incorporated into a television which may display programming content received from a set top box. The set top box may be connected to the television utilizing a HDMI cable and the set top box may transmit a control signal via the a HDMI cable instructing the television to generate and display a matrix code that includes configuration information for configuring the remote control device 103 to control the television.

Figure 4A:
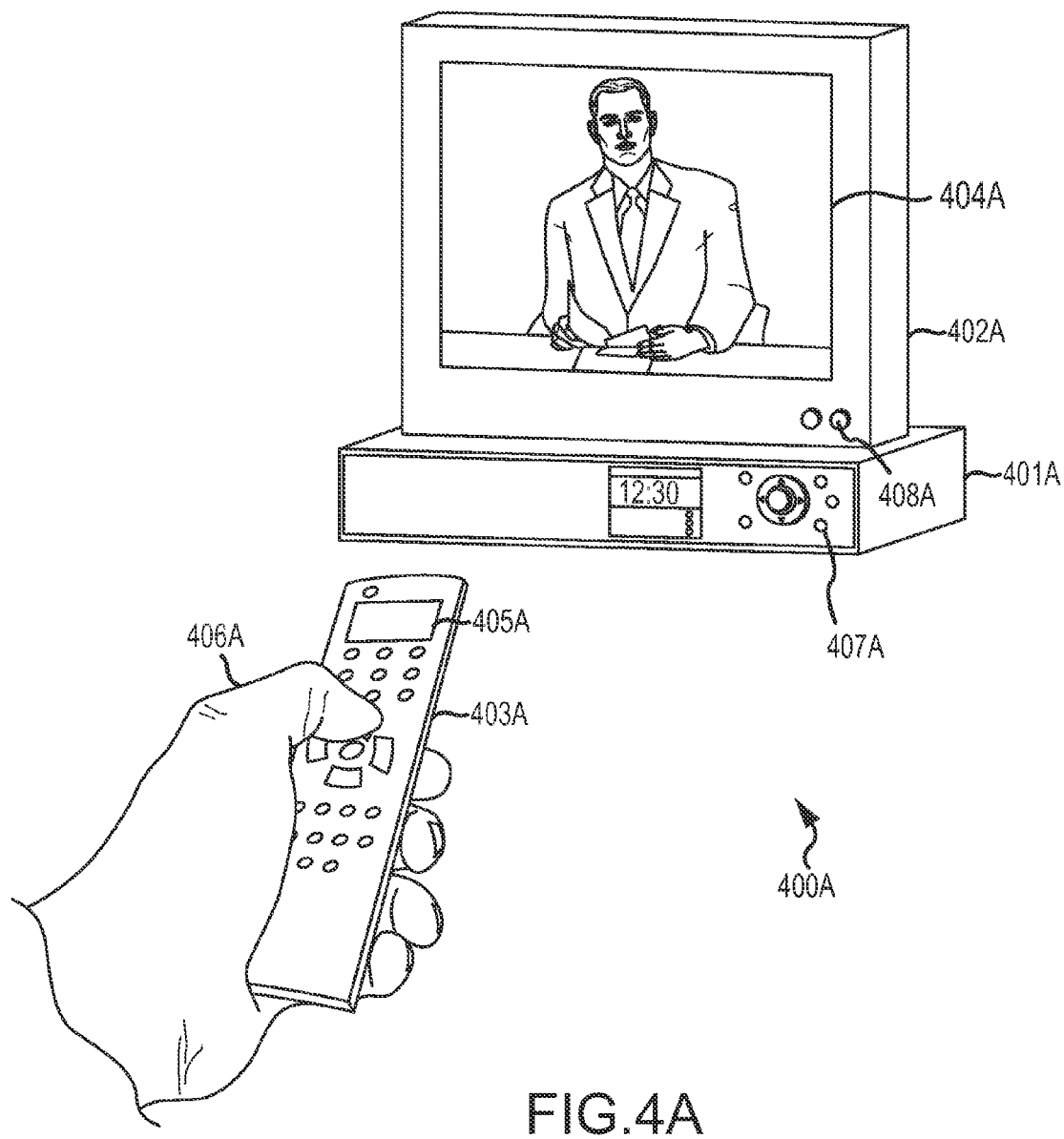
FIGS. 4A-4F are diagrams illustrating a user utilizing a system for configuring a first sample remote control device utilizing matrix codes. The system may be the system of FIG. 1.
Figure 4B:
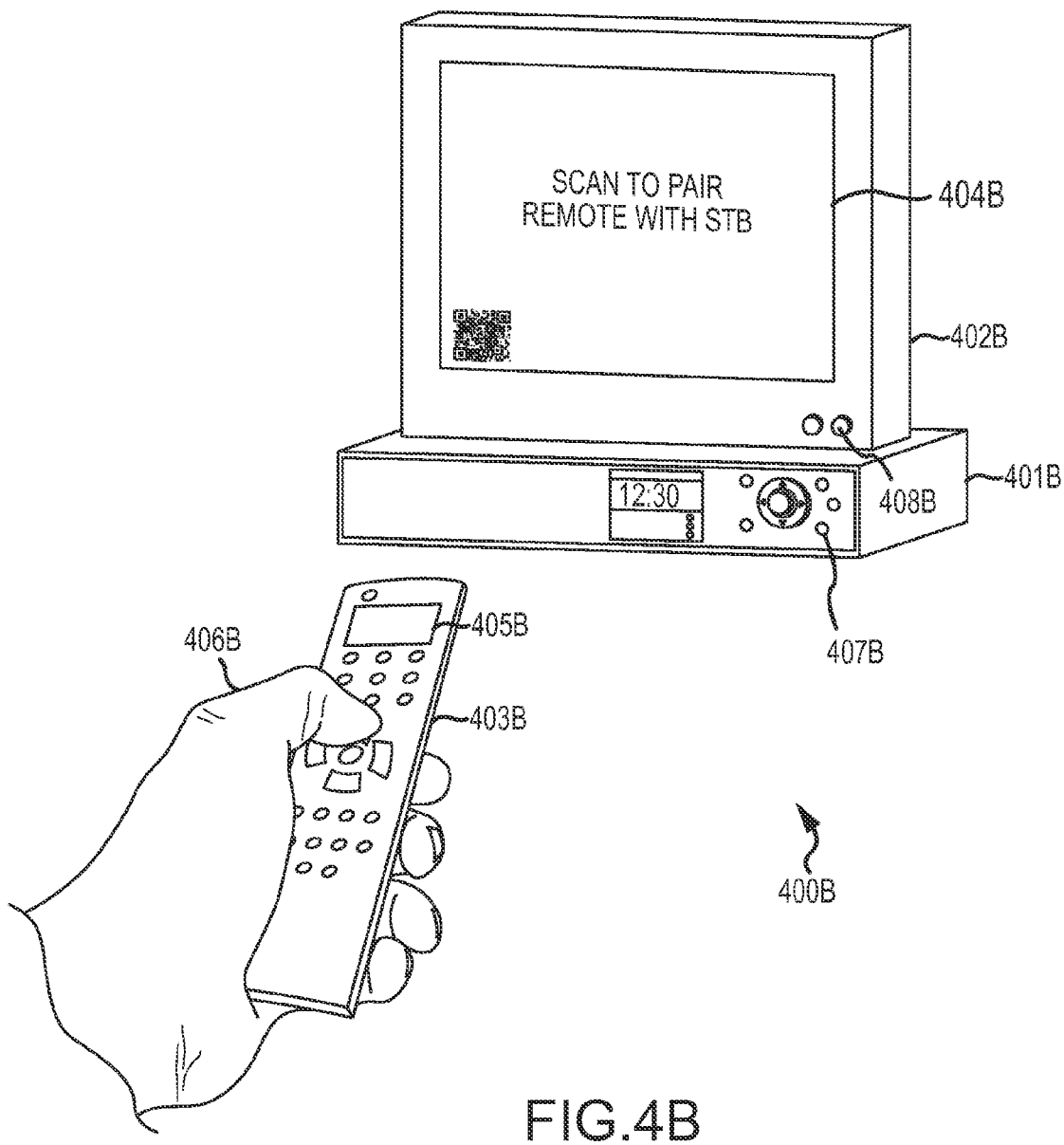
Figure 4C:
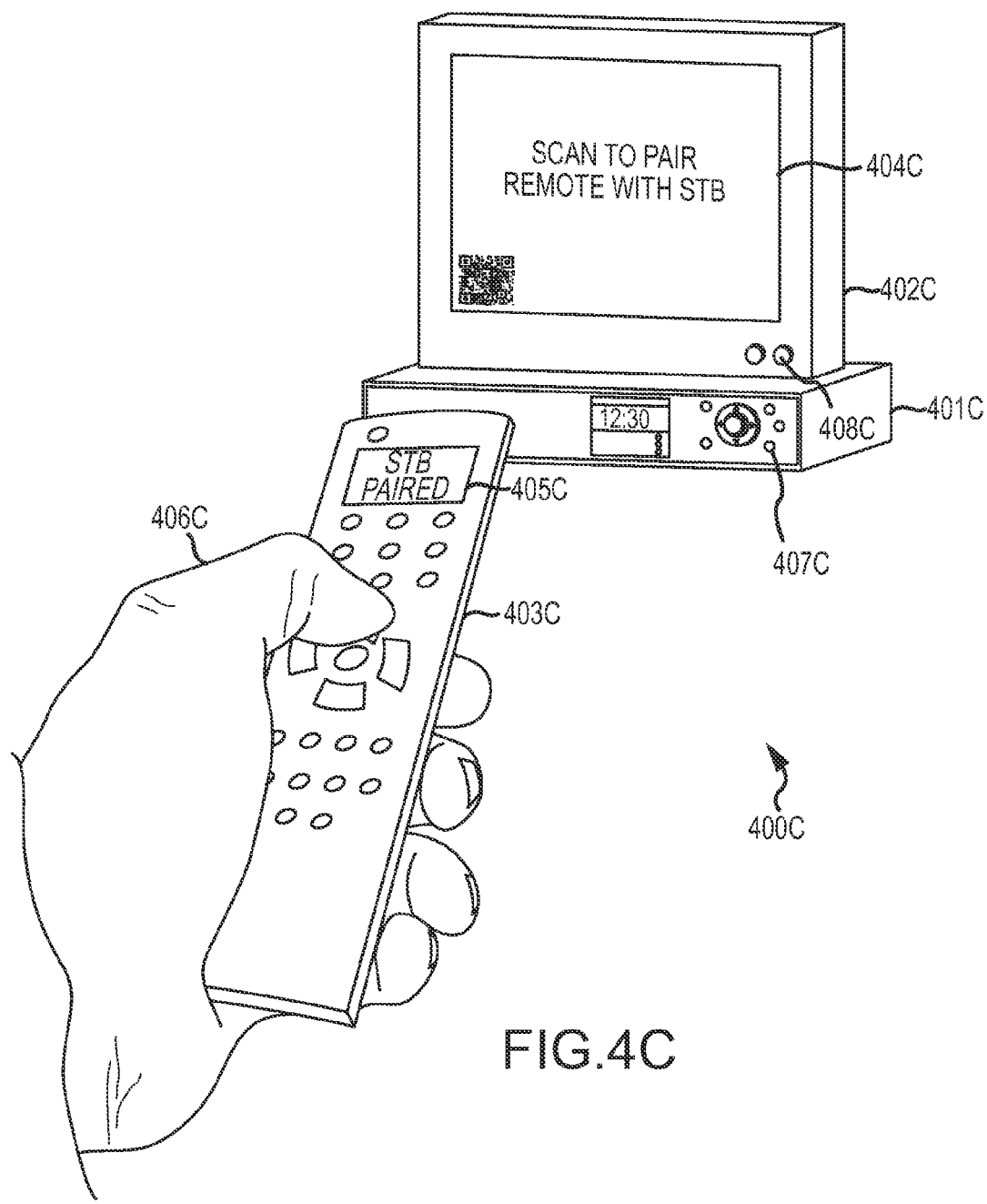
Figure 4D:
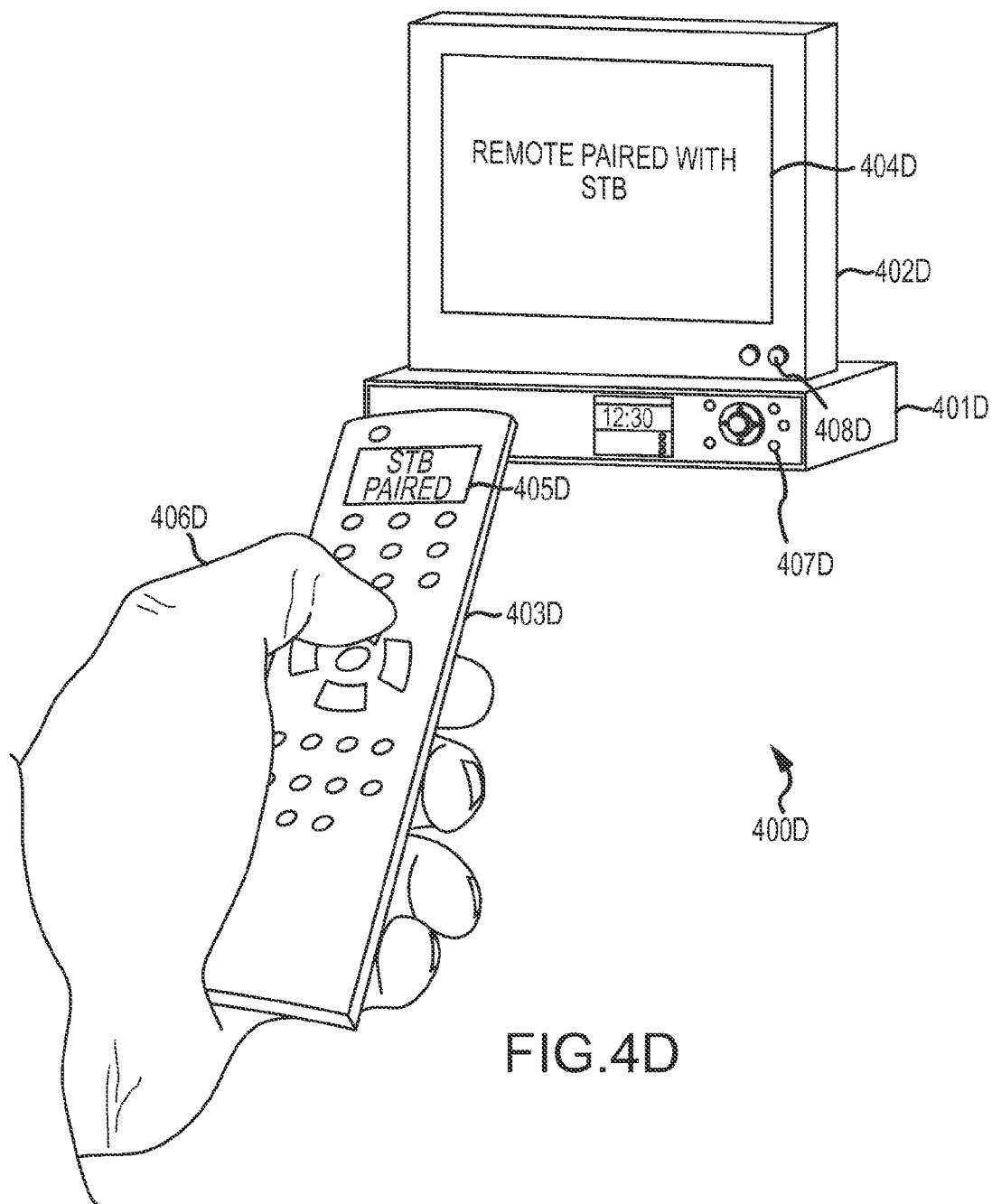

FIGS. 4A-4F illustrate a user 406A-406F utilizing a system 400A-400F for configuring a first sample remote control device 403A-403F utilizing matrix codes. The system may be the system of FIG. 1. In this example implementation, a user 406A is attempting to pair a remote control device 403A with a set top box 401A which is displaying programming content on a television 402A. The user may trigger the pairing process by selecting a selection element 407A of the set top box and (as illustrated in FIG. 4B) the set top box 401B may then generate and display a matrix code on the screen 404B of the television 402B that includes configuration information for pairing the remote control device 403B with the set top box. The remote control device may then scan and decode the matrix code and configure itself to pair with the set top box. As illustrated in FIG. 4C, the remote control device 403C may then display an indicator via an indicator element 405C of the remote control device indicating that the remote control device has been paired with the set top box.

Further, in response to the configuration information, the remote control device 403C may transmit remote control identifying information to the set top box 401C. Upon receipt of such remote control identifying information, the set top box 401D may configure itself to pair with the remote control device 403D and may display a message on the screen 404D of the television 402D indicating that the set top box has been paired with the remote control device.

Figure 4E:
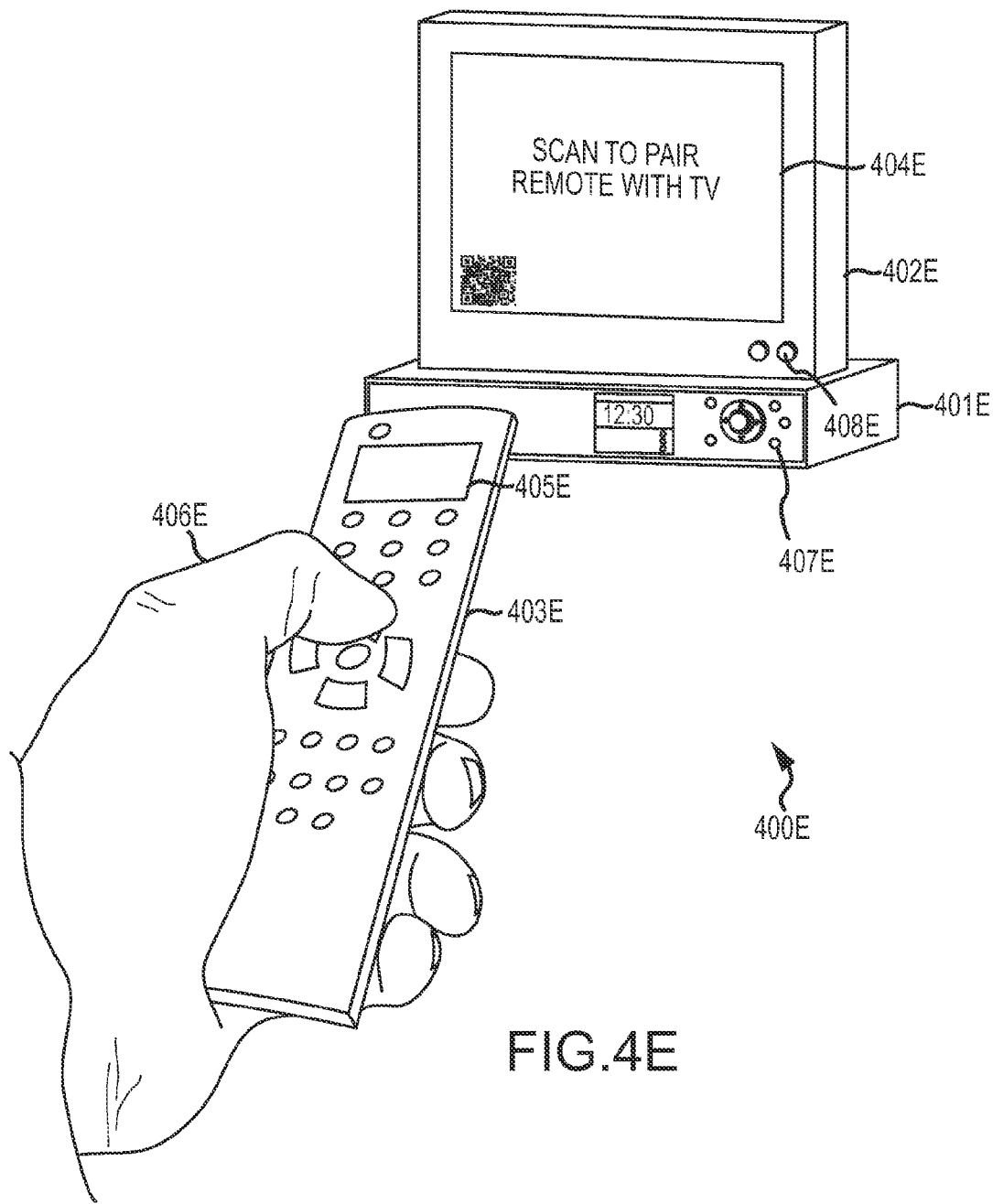
Figure 4F:
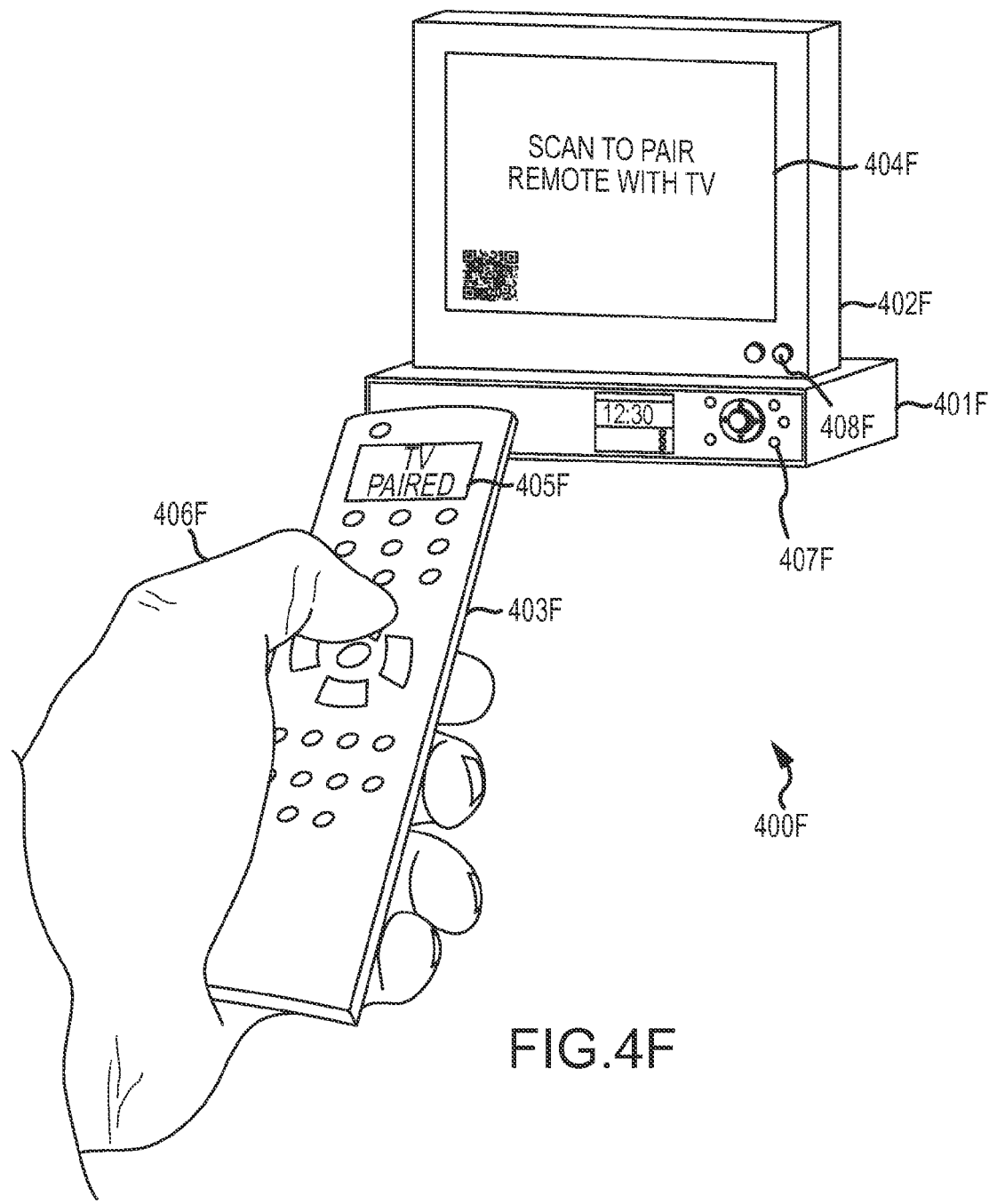

Additionally, the remote control device 403D may be a "universal remote" and the user may attempt to pair the remote control device with the television 402D in addition to the set top box 401D. Hence, the user may trigger the pairing process by selecting a selection element of the television 408D and (as illustrated in FIG. 4E) the television 402E may then generate and display a matrix code on the screen 404E that includes configuration information for pairing the remote control device 403E with the television. The remote control device may then scan and decode the matrix code and configure itself to pair with the television. As illustrated in FIG. 4F, the remote control device 403F may then display an indicator via an indicator element 405F of the remote control device indicating that the remote control device has been paired with the television.

Figure 5A:
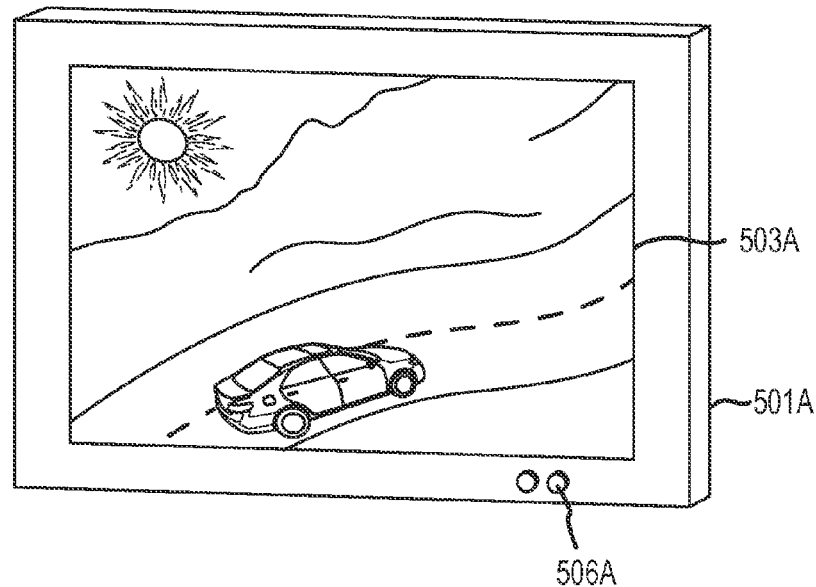
FIGS. 5A-5E are diagrams illustrating a user utilizing a system for configuring a second sample a remote control device utilizing matrix codes. The system may be the system of FIG. 1.
Figure 5A:
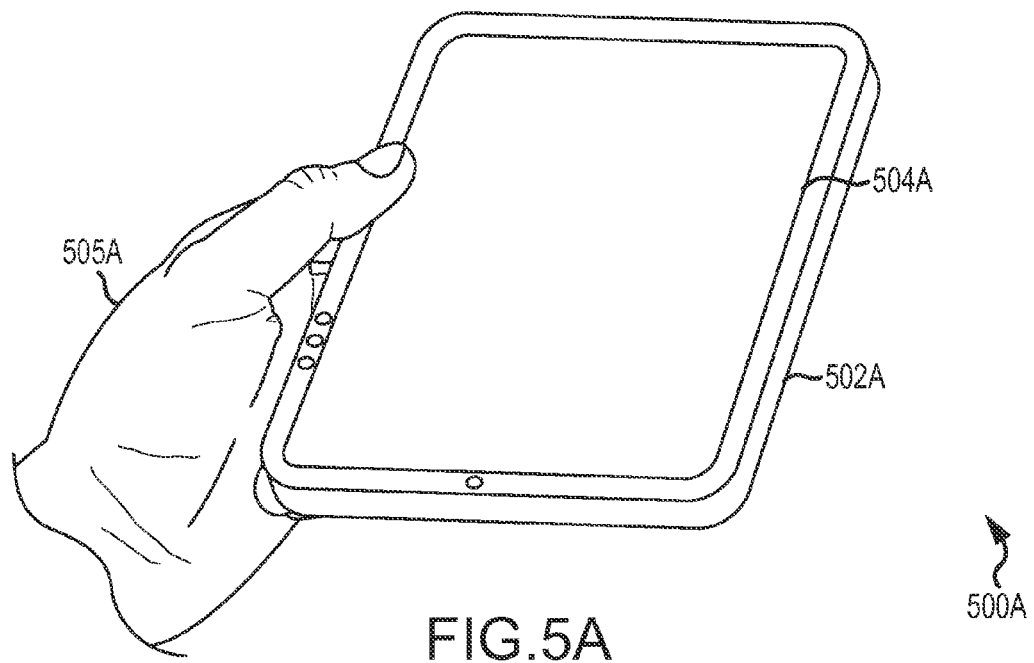
Figure 5B:
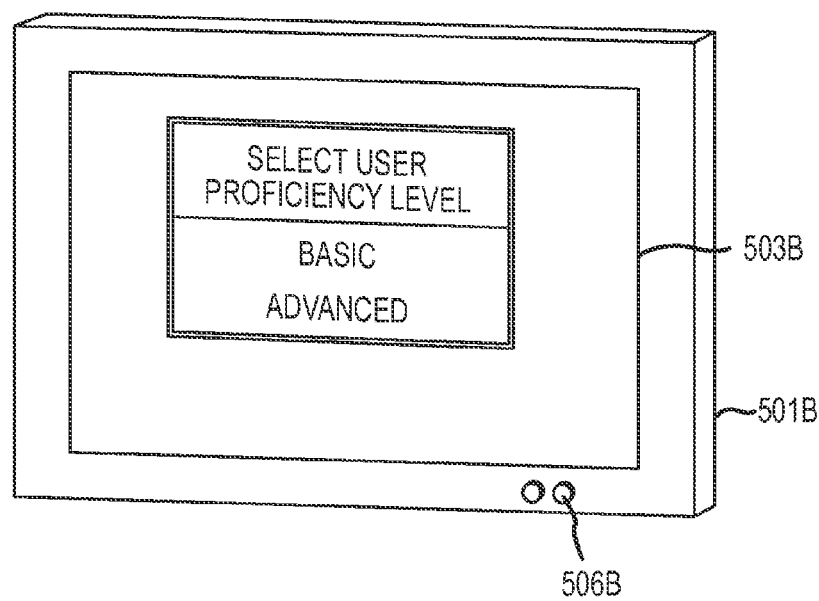
Figure 5B:
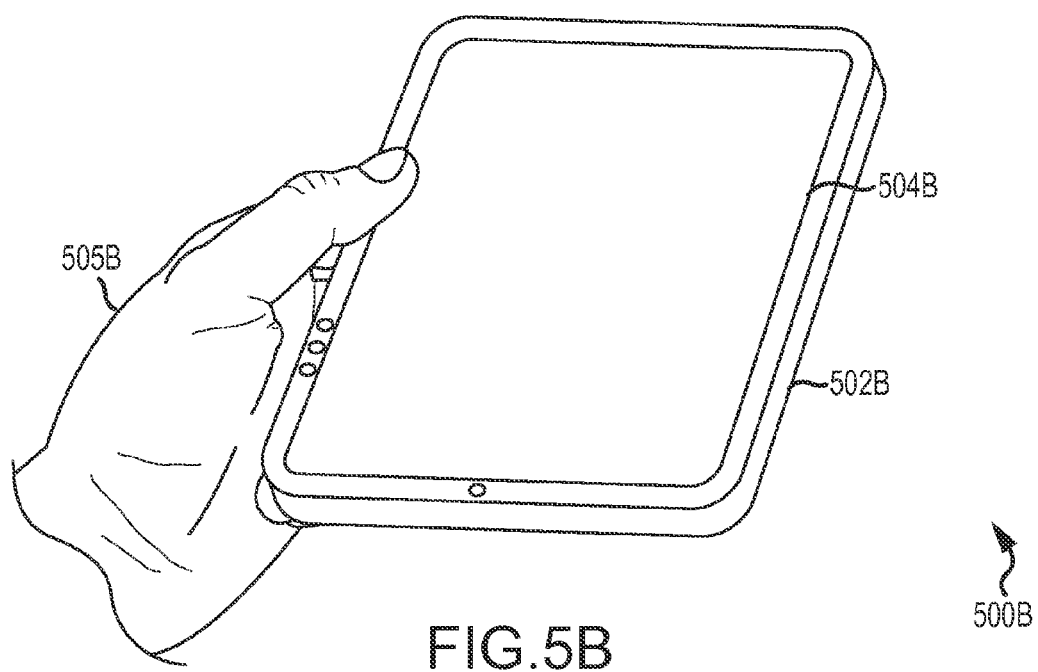

FIGS. 5A-5E illustrate a user utilizing a system 500A-500E for configuring a second sample remote control device 502A-502E utilizing matrix codes. The system may be the system of FIG. 1. In this example implementation, a user 505A is attempting to set up a remote control software application running on a tablet computer 502A as a remote control device for a television 501A. The user may trigger the set up process by selecting a selection element 506A of the television and (as illustrated in FIG. 5B) the television 501B may then present a menu where the user can indicate (again utilizing selection elements of the television whether he has a basic technical proficiency level or an advanced proficiency level.

Figure 5C:
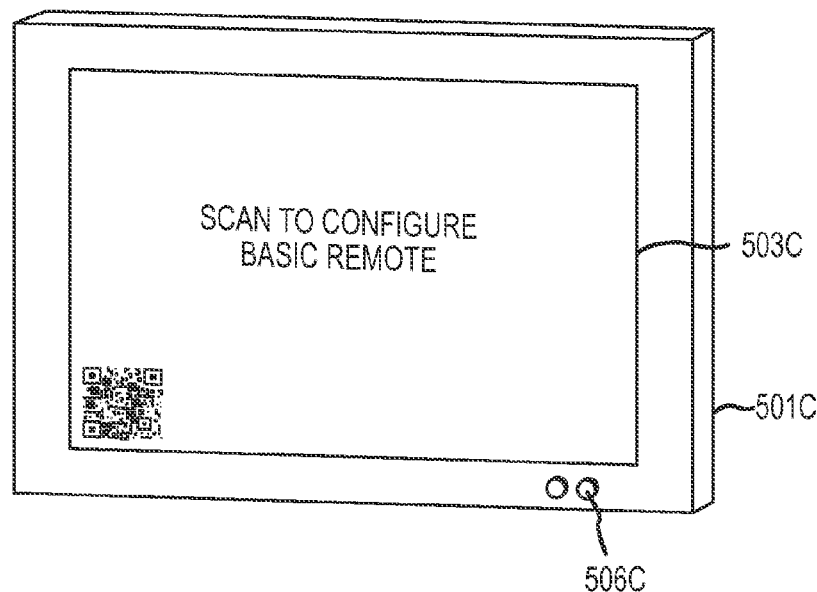
Figure 5C:
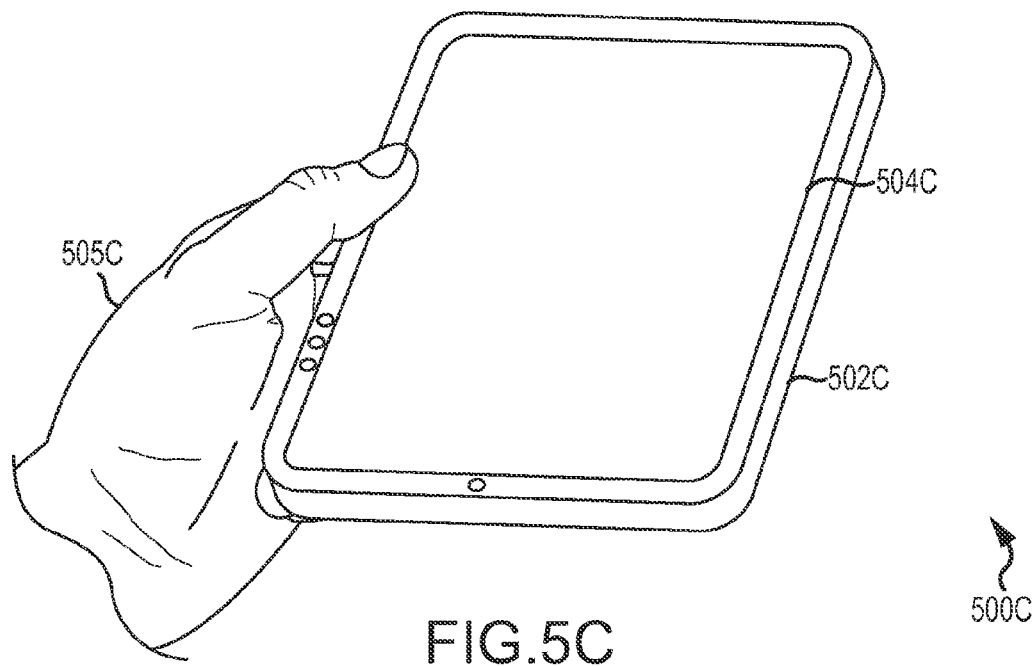
Figure 5D:
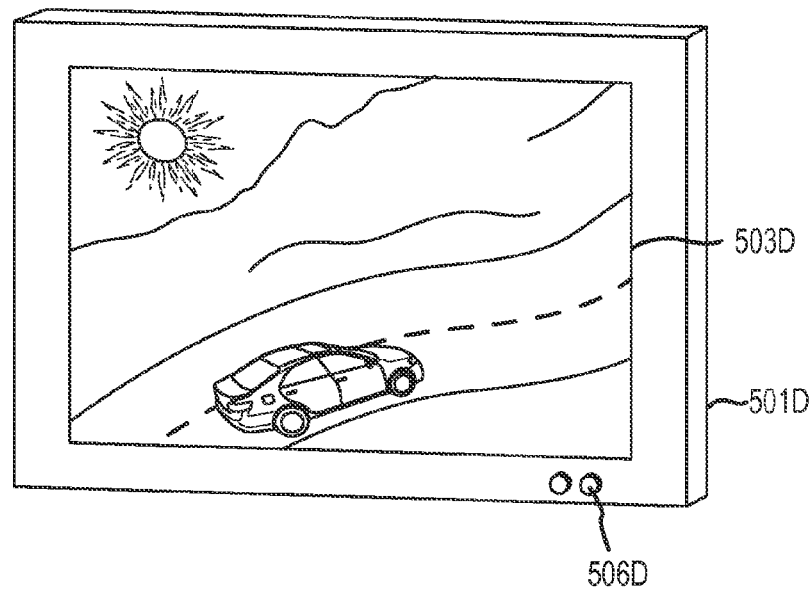
Figure 5D:
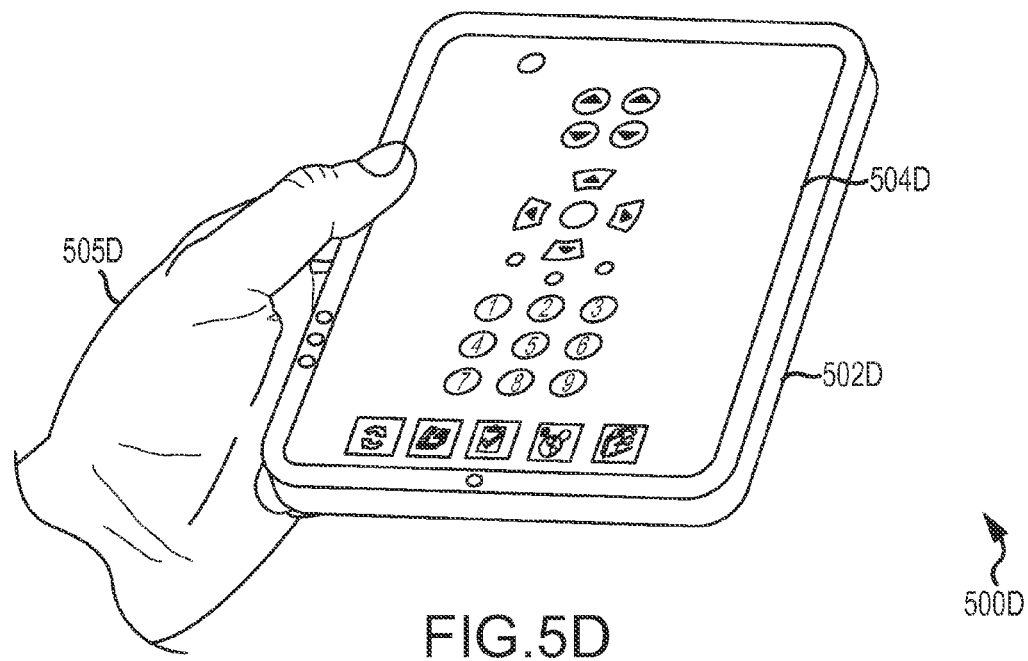

As illustrated in FIG. 5C, if the user 505C selects the basic proficiency level option, the television 501C may generate and display a matrix code on the screen 503C that includes configuration information for setting up the tablet computer 502C as a basic remote control device for the television. The tablet computer 505D may then scan and decode the matrix code and configure itself to present a basic remote control device interface for the television 501D on a touch screen 504D, as shown in FIG. 5D.

Figure 5E:
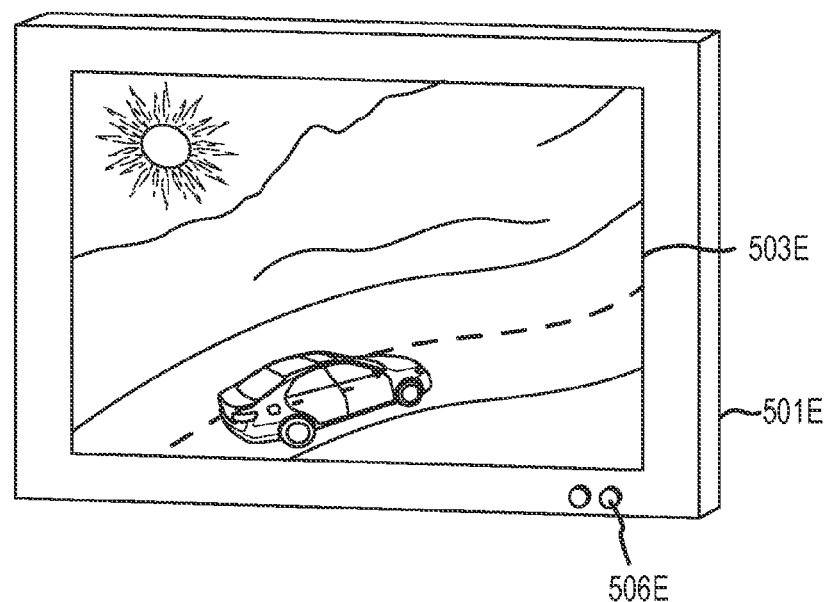
Figure 5E:
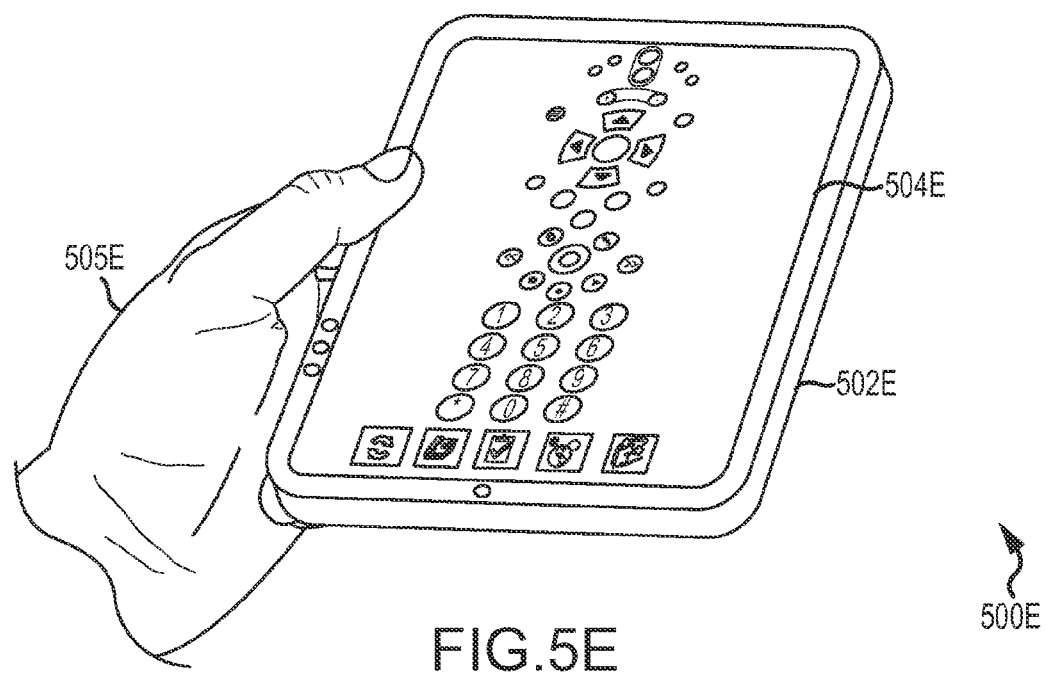

However, as illustrated in FIG. 5E, if the user 505E selected the advanced proficiency level option instead of the basic proficiency level, after scanning and decoding the matrix code displayed by the television, the tablet computer 502E may configure itself to present an advanced remote control device interface for the television 501E on the touch screen 504E.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for configuring remote control devices using matrix codes, the method comprising:
   determining, by an electronic device, configuration information that comprises a plurality of parameters for at least one remote control device to directly configure itself to control the electronic device, the configuration information associated with a particular proficiency profile preselected by a user of the at least one remote control device from among a basic proficiency level profile and an advanced proficiency level profile;
   generating, by the electronic device, at least one matrix code that includes the configuration information; and
   transmitting the at least one matrix code from the electronic device to at least one display device wherein the at least one matrix code can be captured by the at least one remote control device when displayed by the at least one display device and decoded to configure the at least one remote control device to control the electronic device based on the configuration information.

2. The method of claim 1, further comprising receiving remote identifying information from the at least one remote control device at the electronic device wherein the at least one remote control device transmits the remote identifying information in response to decoding the at least one matrix code.

3. The method of claim 1, wherein the electronic device is configured to interact with an additional electronic device and the configuration information comprises information for configuring the at least one remote control device to control the electronic device in context of the interaction with the additional electronic device.

4. The method of claim 1, wherein the configuration information includes at least one of a communication identifier for the electronic device, a network address for the electronic device, a serial number for the electronic device, a model number for the electronic device, an instruction to add at least one remote control device function, or an instruction to alter at least one remote control device function.

5. The method of claim 1, wherein said operation of generating at least one matrix code that includes the configuration information further comprises receiving an instruction from at least one additional electronic device to generate the at least one matrix code.

6. The method of claim 1, wherein the basic proficiency level profile defines a subset of available remote control features for enablement by the remote control device and the advanced proficiency level profile defines a full set of available remote control features for enablement by the remote control device.

7. A method for configuring a remote control device using matrix codes, the method comprising:
   detecting, by the remote control device, at least one matrix code displayed by at least one display device wherein the at least one matrix code includes configuration information for the remote control device to control the at least one electronic device, the configuration information associated with a particular proficiency profile selected by a user of the remote control device prior to the detecting from among a basic proficiency level profile and an advanced proficiency level profile;

deriving, by the remote control device, from the at least one matrix code configuration information for the remote control device to directly configure itself to control the at least one electronic device; and configuring the remote control device to control the at least one electronic device based on the configuration information.

8. The method of claim 7, further comprising transmitting remote identifying information from the remote control device to the at least one electronic device in response to detecting the at least one matrix code.

9. The method of claim 7, further comprising:

deriving additional configuration information for configuring the remote control device to control at least one additional electronic device, from at least one of the at least one matrix code or at least one additional matrix code generated by the at least one additional electronic device and detected by the remote control device; and configuring the remote control device to control the at least one additional electronic device based on the additional configuration information.

10. The method of claim 7, wherein the at least one electronic device is configured to interact with an additional electronic device and the configuration information comprises information for configuring the remote control device to control the at least one electronic device in context of the interaction with the additional electronic device.

11. The method of claim 7, wherein the configuration information includes at least one of a communication identifier for the at least one electronic device, a network address for the at least one electronic device, a serial number for the at least one electronic device, an instruction to add at least one remote control device function, an instruction to remove at least one remote control device function, or an instruction to alter at least one remote control device function.

12. The method of claim 11, wherein the configuration information includes at least one of the serial number for at least one electronic device or the model number for the at least one electronic device, further comprising obtaining at least one of the instruction to add at least one remote control device function, or the instruction to alter at least one remote control device function by querying a database based on the at least one of the serial number for the at least one electronic device or the model number for the at least one electronic device.

13. The method of claim 7, wherein the database is stored in at least one of a non-transitory storage media incorporated into the remote control device or a database server that is separate from the remote control device.

14. A system for configuring remote control devices using matrix codes, comprising:

at least one non-transitory storage media that stores a set of instructions;

at least one processing unit that executes the set of instructions to select a configuration profile from amongst multiple profiles based on user-preference for at least one remote control device to configure itself to enable one of a subset and a full set of available remote control features to control the at least one electronic device, and generate at least one matrix code including configuration information associated with a particular user-preferred configuration profile; and at least one communication component to transmit the at least one matrix code to at least one display device;

wherein the at least one matrix code can be detected by the at least one remote control device when displayed by the at least one display device and decoded to configure the at least one remote control device to control the at least one electronic device from the configuration information.

15. The system of claim 14, further comprising the remote control device wherein the remote control device further comprises:

at least one optical detector that detects the at least one matrix code displayed on the at least one display device; and at least one remote control processing unit that derives the configuration information from the detected at least one matrix code and configures the remote control device to control the at least one electronic device based on the configuration information.

16. The system of claim 15, wherein the at least one electronic device is configured to interact with an additional electronic device and the configuration information comprises information for configuring the at least one remote control device to control the at least one electronic device in context of the interaction with the additional electronic device.

17. The system of claim 15, wherein the remote control device further comprises at least one transmitter component and the at least one remote control processing unit transmits remote identifying information to the at least one communication component via the at least one transmitter component.

18. The system of claim 15, wherein the configuration information includes at least one of a communication identifier for the at least one electronic device, a network address for the at least one electronic device, a serial number for the at least one electronic device, a model number for the at least one electronic device, an instruction to add at least one remote control device function, an instruction to remove at least one remote control device function, or an instruction to alter at least one remote control device function.

19. The system of claim 15, wherein the at least one remote control processing unit derives additional configuration information for configuring the at least one remote control device to control at least one additional electronic device from at least one of the at least one matrix code or an additional at least one matrix code generated by the at least one additional electronic device and detected by the at least one optical detector and the at least one remote control processing unit configures the remote control to control the at least one additional electronic device based on the additional configuration information.

* * * * *